3,202,277
DUAL SEAL PACKAGE
William Lewi, 37—01 Vernon Blvd.,
Long Island City, N.Y.
Filed Mar. 19, 1964, Ser. No. 353,143
1 Claim. (Cl. 206—78)

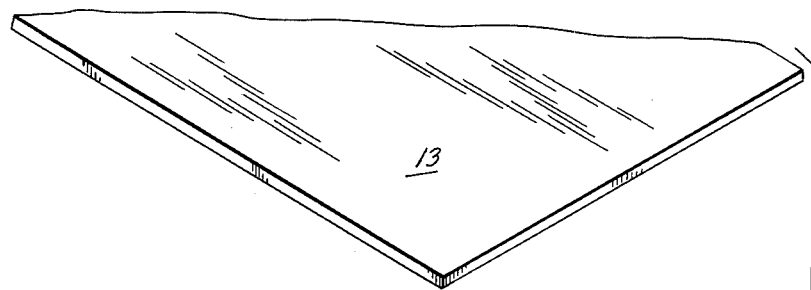
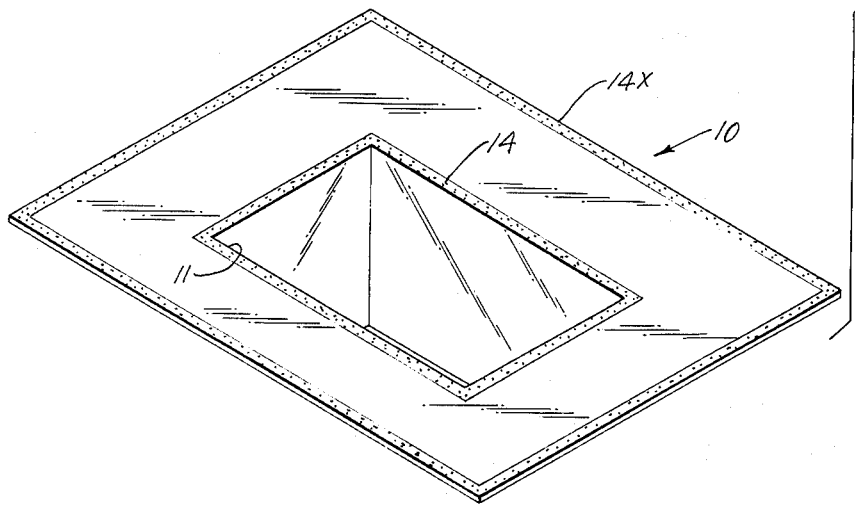
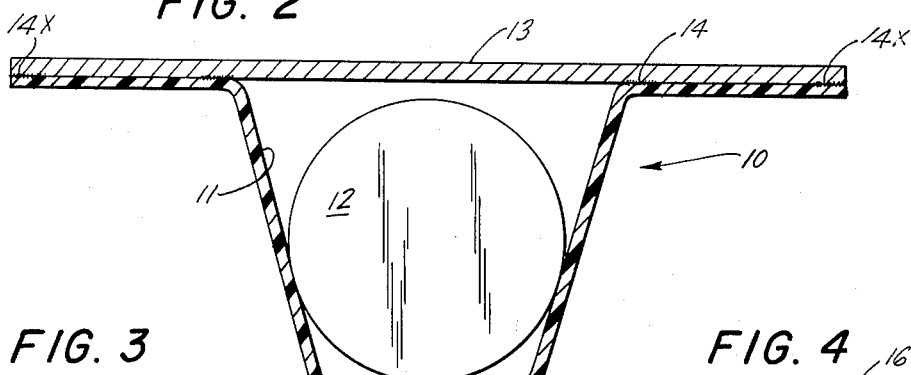
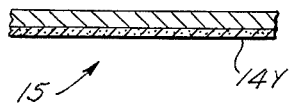

This invention relates to a novel package and more particularly to packaged merchandise wherein the merchandise is encapsulated in a blister or cavity of transparent plastic sheeting secured by means of dual spaced-apart continuous seals to a second sheet, preferably of planar construction and having advertising material printed thereon.

Thus modern packaging, particularly of small items, displays the item to be sold, and also advertises the item enclosed in the blister or cavity.

However, the blister if premolded and then secured to the plastic coated paperboard along a narrow flange edge by heat sealing may be relatively easily lifted away from the coated paperboard without destroying the plastic film on the paperboard. Thus a person can carefully lift the blister by prying up the sealed flange edge thereof and remove the merchandise without the package showing any self-evident signs of tampering therewith.

It is therefore an object of this invention to provide a dual sealed plastic blister package by effecting a peripheral tamper proof edge seal around the paperboard as well as by providing an inner seal around the merchandise.

It is a further object to provide a method of effecting the dual seal of this invention in a continuous operating machine of intermittent operations.

These and other objects and purposes of this invention will become apparent upon reading the following descriptive disclosure thereof taken in conjunction with accompanying drawing in which:

FIG. 1 is an exploded view of an illustrative embodiment showing top planar sheet and a bottom blister containing sheet and showing by means of stippling a pair of critically spaced-apart layers of adhesive for the subsequent sealing together of said sheets, FIG. 2 is a transverse enlarged view taken through the heat and pressure fused assembled sheets of FIG. 1 and showing the dual spaced-apart continuous seals, one being disposed around the center cavity for holding the merchandise and the other being disposed around the periphery of the package and hence of both sheets, FIG. 3 is a transverse section through a fully adhesively coated board sheet, and FIG. 4 is a tranverse section through a fully thermoplastic coated board sheet.

This invention is concerned with packaging having dual continuous spaced-apart seals disposed about one or more merchandise holding cavities disposed in a transparent plastic sheet secured to a second sheet or board.

The second sheet or board is preferably of planar construction and may be of suitable plastic material, or it may be suitable plastic coated paperboard or the board may be conventional uncoated paperboard or the board may be completely coated with a heat pressure activated adhesive composition.

After depositing the merchandise in the cavity or blister of the plastic sheet, either by hand or automatically it is then covered with the display board sheet and the film and board sheet are then sealed together under heat and pressure conditions at predetermined seal lines.

To bring about this sealing together along predetermined continuous seal lines a suitable adhesive may be used. Where both the sheet and board are of suitable thermoplastic material the use of said adhesive is unnecessary.

The adhesive used in this invention is of a conventional composition which is heat and pressure activated or actuated to effect the desired sealing properties. The adhesive may be applied to the board or to the film, as desired.

Where, for example, both the blister or cavity containing sheet and the board are of suitable plastic material no adhesive may be necessary, as when both are of thermoplastic composition and when the board is coated with suitable thermoplastic material.

The board sheet may be completely coated with adhesive as shown in FIG. 3 or it may be completely coated with a thermoplastic composition as shown in FIG. 4.

In any event the plastic sheet and appropriate board sheet are pressure sealed using resistant heating, impulse sealing or high frequency sealing applied along the predetermined seal lines.

Turning now to the drawing, the cavity 10 is preferably molded from a continuous roll of clear plastic film as described in U.S. 2,896,943 by intermittent operation of the frame chain thereof.

However, the dual seal package of this invention is not limited to its mode of manufacture nor by the illustrations of the drawing.

The sheet 10 may be made from clear plastic, for example, cellulose acetate, cellulose butyrate, polyethylene, polystyrene, polyvinyl chloride, Mylar or even from other suitable film and foil material.

The sheet 10 is provided with a molded cavity 11 and merchandise 12 is deposited therein.

Where because of the composition of the plastic sheet 10 and the composition of the board 13, it is advisable to use a suitable heat and pressure activated adhesive 14, such adhesive may be applied along continuous predetermined paths, one path being around and adjacent to the cavity and the other around and adjacent to the periphery of the final package as punched out at the final operation of the frame chain as described in U.S. 2,896,943. On the other hand a fully adhesively coated paperboard 15 having a coating 14Y may be used.

The adhesive may be imprinted or otherwise transferred to either the cavitated sheet or to the display board as desired.

As shown in the embodiment of FIG. 1, the inner adhesive seal 14 is deposited around and adjacent to the cavity or plurality of centrally located cavities, as the case may be. The outer adhesive seal 14X is deposited suitably away from the inner seal 14 and within the frame of the chain so that after being heat sealed the punch-out freeing the package is made around the edge of the seal 14X.

Such a heat seal at 14X is rigid and along with the seal at 14 doubly protects the package from pilfering since the outer edge seal must be first torn before the inner seal can be torn.

The paperboard 16 of FIG. 4 is provided with a suitable over-all coating of thermoplastic composition 17.

Such a board 16 or a board 13 is secured to a blister sheet 10 by use of heat and pressure applied for example, by a pair of spaced-apart continuous rails having the shape of the desired pair of spaced-apart continuous seals formed thereby.

This invention is clearly of a broad scope and is not to be limited to the many illustrations thereof shown in the drawing and described in the specification.

I claim:

A rigid tamper proof dual sealed package for merchandise encapsulated therein comprising a rigid transparent plastic sheet having at least one merchandise holding cavity, having a suitable wide peripheral flange about said cavity, an article of merchandise disposed in said cavity and a suitably coated planar relatively rigid board sheet disposed over said peripherally flanged sheet in edge to edge relationship, said package having parallel spaced-apart heat-pressure seals securing said flange to said rigid board, one of said seals being an inner seal line located adjacent to said holding cavity and the other being an outer seal line located at the continuous extreme edges of said two sheets, said outer seal line sealing said extreme edges of said two sheets continuously into a single bonded tamper proof integral edge.

References Cited by the Examiner

UNITED STATES PATENTS

| | | | |
|---|---|---|---|
| 2,736,656 | 2/56 | Marshall. | |
| 2,876,899 | 3/59 | Maynard | 206—80 |
| 2,911,681 | 11/59 | Distler. | |
| 2,947,415 | 8/60 | Garth | 206—63.2 |
| 2,952,353 | 9/60 | Rohdin | 206—45.34 |
| 2,954,116 | 9/60 | Maso et al. | 206—63.2 |
| 2,984,346 | 5/61 | Holley | 206—65 |
| 3,075,329 | 1/63 | Swezey et al. | |

THERON E. CONDON, *Primary Examiner.*

GEORGE O. RALSTON, *Examiner.*